United States Patent
Cantin et al.

(10) Patent No.: US 8,229,867 B2
(45) Date of Patent: Jul. 24, 2012

(54) BIT-SELECTION FOR STRING-BASED GENETIC ALGORITHMS

(75) Inventors: Jason F. Cantin, Austin, TX (US); Donald R. DeSota, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 12/277,680

(22) Filed: Nov. 25, 2008

(65) Prior Publication Data

US 2010/0131439 A1 May 27, 2010

(51) Int. Cl.
*G06F 17/30* (2006.01)
(52) U.S. Cl. .......................................................... 706/13
(58) Field of Classification Search ................... 706/13; 708/231
See application file for complete search history.

(56) References Cited

U.S. PATENT DOCUMENTS

| 5,970,487 | A | 10/1999 | Shackleford et al. |
| 6,035,311 | A * | 3/2000 | McCool et al. ............... 708/231 |
| 6,941,287 | B1 | 9/2005 | Vaidyanathan et al. |
| 6,957,200 | B2 * | 10/2005 | Buczak et al. .................. 706/13 |
| 2003/0181210 | A1 | 9/2003 | Shipman |
| 2004/0143524 | A1 | 7/2004 | Hilton |
| 2005/0097559 | A1 | 5/2005 | He |
| 2007/0094161 | A1 | 4/2007 | Calabro et al. |
| 2007/0208691 | A1 | 9/2007 | Ramakrishnan |

* cited by examiner

*Primary Examiner* — Jeffrey A Gaffin
*Assistant Examiner* — Ola Olude Afolabi
(74) *Attorney, Agent, or Firm* — Yee & Associates, P.C.

(57) ABSTRACT

Selecting bits in a string-based genetic algorithm is provided. A type of genetic operation to perform is determined. Responsive to a determination to perform a crossover operation, an input comprising a pair of strings is received. The strings in the pair of strings are compared to identify a set of non-matching points. A set of points from the set of non-matching points is randomly selected, forming a set of randomly selected non-matching points. A new string for the pair of strings is generated using the set of randomly selected non-matching points.

20 Claims, 5 Drawing Sheets

|  |  | 1234 | 5678 | 111<br>9012 | 1111<br>3456 ← 500 |
|---|---|------|------|-------------|-------|
| 402 ↘ | PARENT 0: | 0111 | 0100 | 1011 | 0100 |
| 404 ↘ | PARENT 1: | 0111 | 0100 | 0011 | 0111 |
| 502 ↗ | XOR: | 0000 | 0000 | 1000 | 0011 |
|  |  |  |  |  | 510 |
| 504 ↗ | UNIQUE POINTS: | 0000 | 0000 | 0000 | 00XX |
|  |  |  |  |  | 512 |

BIT-SELECTION FOR STRING-BASED GENETIC ALGORITHMS

BACKGROUND OF THE INVENTION

1. Field of the Invention

The present invention relates generally to string-based genetic algorithms and more specifically to a computer implemented method, apparatus, and computer program product for selecting bits for genetic operations in a string-based genetic algorithm.

2. Description of the Related Art

Genetic algorithms are software tools that use techniques loosely based on Darwinian evolution to evolve solutions to design problems such as combinatorial optimization. They start with randomly generated and/or seeded populations of solutions (a primordial stock), and use the Darwinian principles of natural selection, sexual recombination, and mutation to create new, more fit solutions.

String-based genetic algorithms have been successfully deployed in many aspects of research and development, and have generated human-competitive solutions to a wide range of problems. Implemented properly, string-based genetic algorithms are very good for exploring large, complex design spaces where other methods, such as linear regressions, design of experiments (DoE), principle component analysis, and Taguchi central composite designs (Taguchi-CCD) fail. String-based genetic algorithms are very robust and resilient against local optima in the design space.

BRIEF SUMMARY OF THE INVENTION

According to one embodiment of the present invention, selecting bits in a string-based genetic algorithm is provided. A type of genetic operation to perform is determined. Responsive to a determination to perform a crossover operation, an input comprising a pair of strings is received. The strings in the pair of strings are compared to identify a set of non-matching points. A set of points from the set of non-matching points is randomly selected, forming a set of randomly selected non-matching points. A new string for the pair of strings is generated using the set of randomly selected non-matching points.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
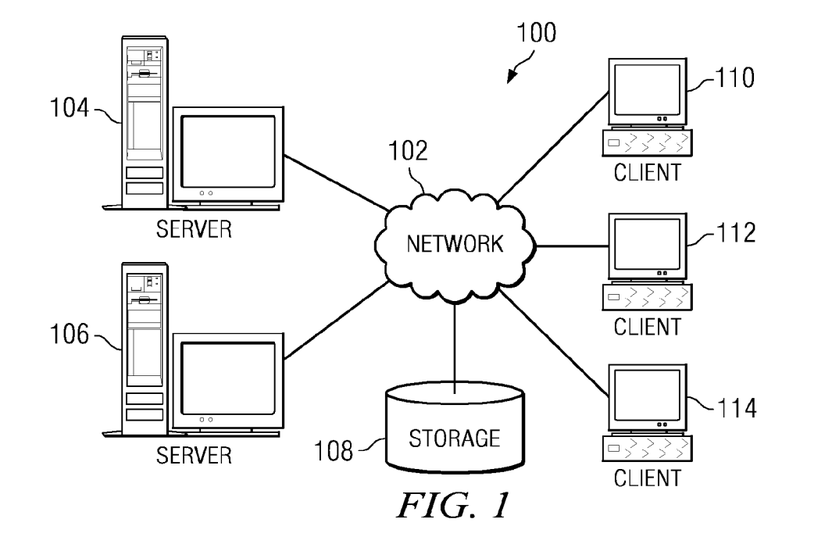
FIG. 1 is a pictorial representation of a network of data processing systems in which illustrative embodiments may be implemented.
Figure 2:
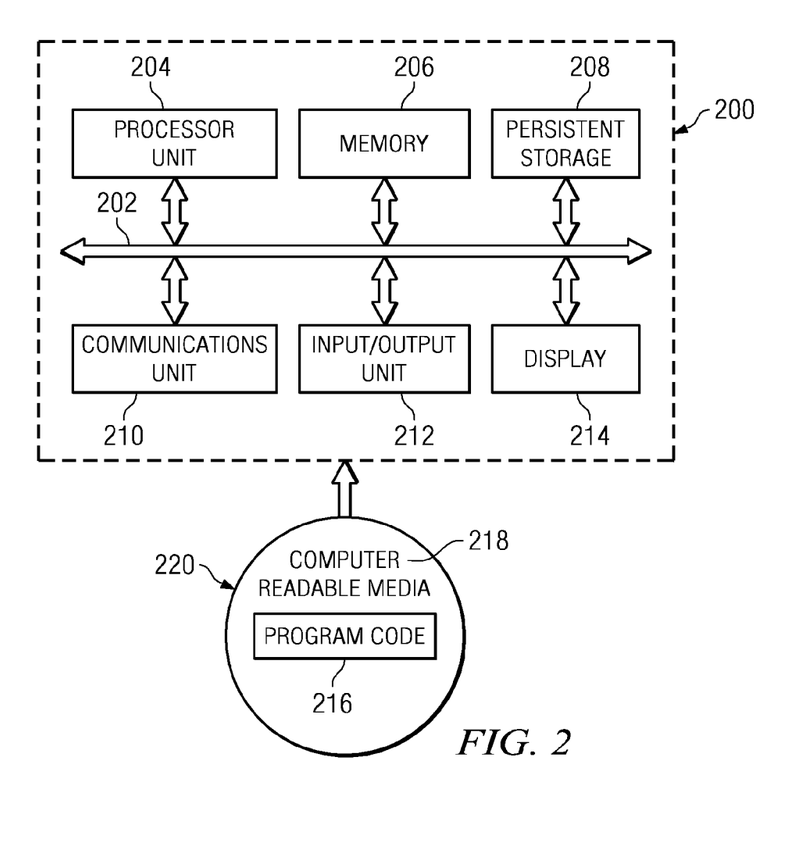
FIG. 2 is a block diagram of a data processing system is shown in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In order to generate a new generation of individuals from a prior generation, the genetic algorithm creates a new empty population and fills the empty population. The empty population is filled when the population contains N strings. Typically, these strings will be unique strings, but the strings do not have to be unique. The empty population is filled by randomly selecting a genetic operation to perform from a set of genetic operations based on user defined rates or probabilities for each of the possible genetic operations; performing the selected genetic operation; and repeating the selecting and performing steps using the operations in the set of genetic operations until the population is full.

There are many types of genetic operations, of which reproduction, mutation, and crossover, are three examples. If a reproduction operation is chosen, a parent is chosen from the prior generation at random, probabilistically favoring fit individuals to unfit ones. That individual is copied unmodified from the prior generation to the new population. Optionally, the individual is only copied into the new population if the individual does not already exist in the new population.

If a crossover operation is chosen, two parents are chosen from the prior generation at random, probabilistically favoring fit individuals to unfit ones. A random bit is selected from the string as a whole -this is the crossover point. A new individual string is created, where bits to the left of the crossover point come from the first parent, and bits to the right come from the second parent. This new individual string is referred to as a child string. The child string is inserted into the population. Optionally, the child string is only inserted into the new population if the child string does not already exist in the new population. Further optionally, in order to ensure a more robust new generation, the child string is only inserted into the new population if the child string does not also exist in the previous generation of strings.

If a mutation operation is chosen, a parent is chosen at random from the prior generation, probabilistically favoring fit individuals to unfit ones. A random bit is selected from the string as a whole. This bit is flipped (value reversed) to create a new offspring. That new offspring is inserted into the new population provided. Optionally, the offspring, or child string, is only inserted the new population if the child string does not already exist in the new population. The child string may also be excluded from the new population if the child string already exists in the previous generation.

Figure 3:
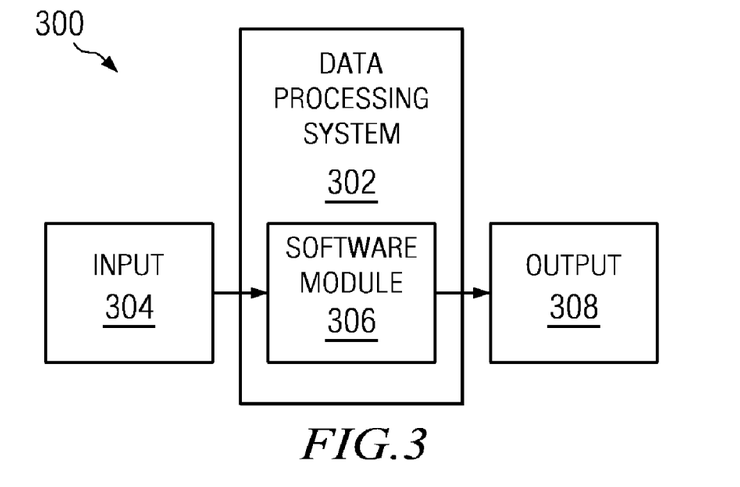
FIG. 3 is a block diagram of a system for selecting bits in a string-based genetic algorithm in accordance with an exemplary embodiment.

FIG. 3 is a block diagram of a system for selecting bits in a string-based genetic algorithm in accordance with an exemplary embodiment. System 300 comprises data processing system 302, input 304 and output 308. Data processing system 302 comprises software module 306. Data processing system 302 may be implemented as a data processing system such as data processing system 200 in FIG. 2. Input 304, output 308 and software module 306 may all be stored in memory of data processing system 302, such as memory 206, persistent storage 208, and computer readable media 218 of FIG. 2. Input 304 may be received from another data processing system or through an I/O unit, such as I/O unit 212 in FIG. 2. Output 308 may be sent to another data processing system, displayed to a user on data processing 302 or communicated to a user through an I/O unit, such as I/O unit 212 in FIG. 2.

Input 304 comprising string based genetic algorithms is received by software module 306. In accordance with an exemplary embodiment, software module 304 identifies and selects unique crossover points from input 304 and generated an offspring of input 304 as output 306. According to a second exemplary embodiment, fields, also referred to as alleles, within the strings of input 304 are weighted equally. Then, an allele from the equally weighted alleles is selected and a bit from this allele is selected to use as a crossover point, thus avoiding favoring alleles with more bits.

Conventional string-based genetic algorithms have a number of shortcomings. First, the selection of crossover points favors the production of some offspring to others, depending on bits common between the parents. This can make the tool susceptible to local optima, and increase the number of generations required to reach a desirable solution. Second, conventional string-based algorithms inadvertently favor the larger alleles the (alleles with the most bits) when choosing bit positions for mutations and crossovers. This is a byproduct of choosing bits randomly from the string as a whole. Moreover, this is sometimes the opposite of what is desired.

Exemplary embodiments provide improvements to string-based genetic algorithms that will give all possible offspring from a crossover an equal probability of being produced, and avoid favoring large alleles for crossovers and mutations.

Exemplary embodiments make the genetic algorithm more robust, more resilient to local optima, and less sensitive to the order of alleles in the string. Exemplary embodiments make the genetic algorithm more efficient by reducing the number of generations and/or population size required to converge on a desirable result, thereby eliminating costly fitness evaluations.

Exemplary embodiments provide for various methods selecting bit positions for genetic operations in string-based genetic algorithms. These new methods can be implemented individually or together as part of an improved string-based genetic algorithm toolset. A first and second parent strings are received as input, forming a pair of parent strings. The pair of parent strings is compared to identify one or more unique crossover points in the pair of strings. A child string is then generated.

One exemplary embodiment identifies and selects only unique crossover points for crossover operations. By selecting only unique crossover points, all possible offspring from the crossover of the selected parents are given an equal probability of being generated. Otherwise, non-matching bits in the selected parents adjacent to bits common between the selected parents have an effectively higher probability of being chosen as a crossover point, and some offspring have a higher probability of being generated than others.

Another exemplary embodiment weights alleles equally when selecting bits for crossover operations and mutation operations so as not to favor alleles that have more bits. Randomly choosing bits from the string as a whole tends to favor alleles in the string with the most bits. In practice, shorter alleles sometimes have more impact on the solution than larger ones.

For the purpose of this discourse, assume that a crossover operation swaps bits from two parent strings, starting with the bit chosen as the crossover point, and including all bits to the right of that point. Without loss of generality, a crossover operation could also be defined as swapping bits to the right of the crossover point (not inclusive), or as involving more than two parent strings or more than one crossover point. A valid crossover occurs when there is at least one non-matching bit between the two parents to the left of the crossover point, and a least one non-matching bit between the two parents to the right of and/or including the crossover point. A valid crossover produces new offspring, whereas an invalid crossover either effectively swaps the two parent strings, or leaves them unchanged.

Figure 4:
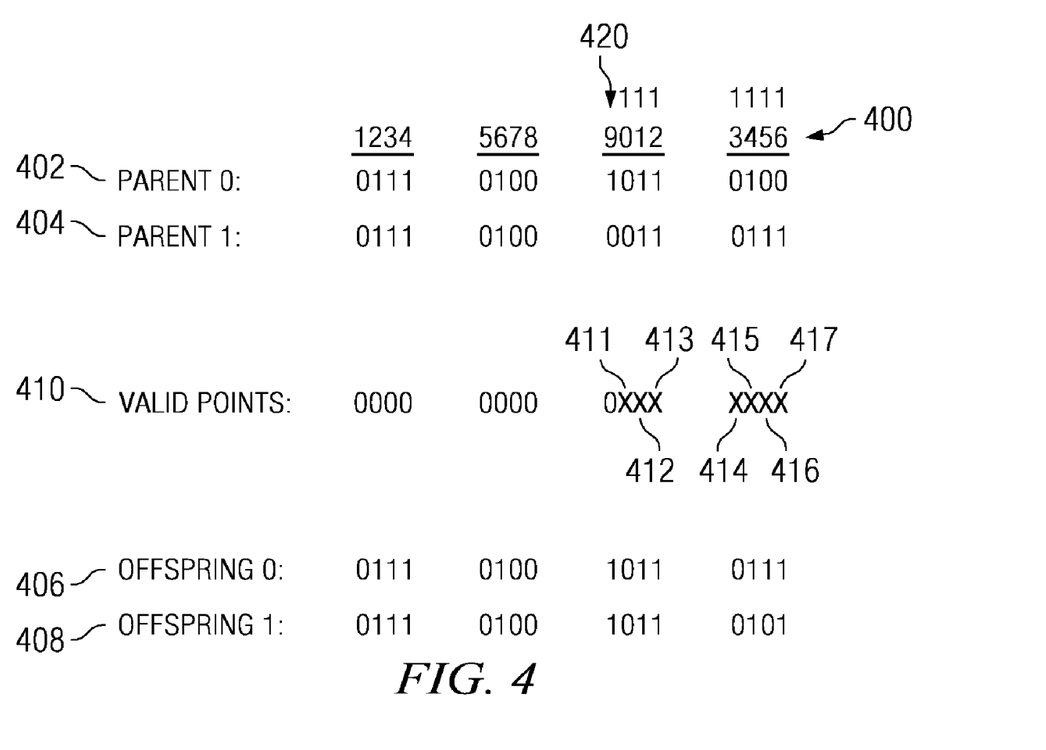
FIG. 4 illustrates selecting bits in a string-based genetic algorithm in accordance with an exemplary embodiment.

FIG. 4 illustrates selecting bits in a string-based genetic algorithm in accordance with an exemplary embodiment. FIG. 4 comprises two parent strings, parent 0 402 and parent 1 404, two offspring strings, offspring 0 406 and offspring 1 408, and the valid crossover points, valid points 410. Row 400 is a counter that indicates the position of the bit in the sequence. The strings in FIG. 4 are comprised of sixteen (16) bits, as indicated in row 400. Valid points 410 indicates the valid crossover points for the two parent strings, parent 0 402 and parent 1 404. The valid crossover points are indicated by an "X" and are denoted as 411-417.

As is common in populations of strings, the two parents have some bits in common with each other. The first nine bits in the two strings are not valid crossover points, because there are no non-matching bits to the left of them. Performing a crossover operation at any one of those bits simply swaps the two parent strings, and does not produce a new offspring. Hence, the first valid crossover point is the bit to the right of the first non-matching bit in the two strings, the ninth bit, denoted as 420. If one were to choose a crossover point randomly from the bits in the string, many attempts would not produce a new offspring. However, this is how conventional, prior art genetic algorithms perform crossover operations.

Only two new offspring may be created from a crossover of the two parent strings, though there are seven valid crossover points 411-417. The reason for this is that of the seven valid crossover points, only two valid crossover points correspond to bits that are not common between the two parent strings, valid crossover points 416 and 417. Choosing any one of the first five valid crossover points has the same effect as choosing the sixth crossover point (416). Only the last two bits in the parent strings are "unique crossover points" that produce unique offspring. Unique crossover points have the property of being non-matching points between the two parent strings. The first six valid crossover points, crossover points 411-416, all have the same effect, they produce offspring 0 406. Therefore, choosing a crossover point randomly from the valid crossover points in the string, the offspring 0 406 is six times more likely to be produced than offspring 1 408. That is, just choosing crossover points or even valid crossover points randomly, some offspring are much more likely to occur than others. This is a problem, because it makes the process of running a genetic algorithm less stochastic, and makes the tool more likely to get stuck in local optima.

Exemplary embodiments overcome this problem by identifying unique crossover points in the parent strings and randomly choosing between them. This gives all possible offspring from the crossover of the two parents an equal probability of being produced, and can increase the genetic algorithm's efficiency, and ability to avoid local optima. For example, in cases where a new, more fit offspring would be less likely to occur based on the valid crossover points, that offspring now has a much higher probability of being generated.

Figure 5:
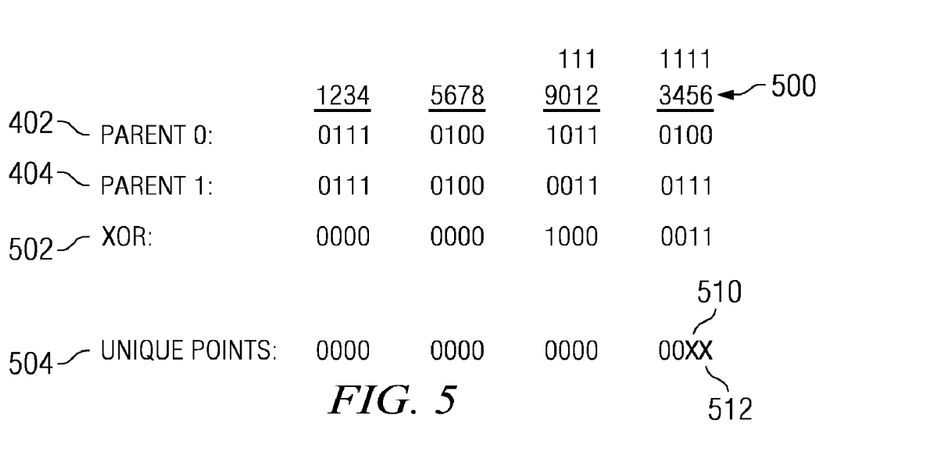
FIG. 5 illustrates selecting bits in a string-based genetic algorithm in accordance with an exemplary embodiment.

FIG. 5 illustrates selecting bits in a string-based genetic algorithm in accordance with an exemplary embodiment. FIG. 5 comprises two parent strings, parent 0 402 and parent 1 404, the result of performing a logical exclusive-OR(XOR) on the parent strings, XOR 502, and the unique crossover points, unique points 504. Row 500 is a counter that indicates the position of the bit in the sequence. The strings in FIG. 5 are comprised of sixteen (16) bits, as indicated in row 500. Unique points 504 indicates the unique crossover points for the two parent strings, parent 0 402 and parent 1 404, points 510 and 512.

According to an exemplary embodiment a logical XOR operation is performed on the parent 0 402 and parent 1 404 to obtain a new string XOR 502, which is an intermediate string. The bits that are different, or non-matching, between the parents are indicated as ones (1) in XOR 502. Then, a population count is performed on XOR 502. The result of the population count is the number of non-matching bits in the two parent strings. In the present example that number is three (3). Next, a number N that is between 1 and the result of the population count minus one (2), inclusive, is randomly chosen. The randomly chosen number N represents the Nth set bit in XOR, which is a randomly-chosen unique crossover point. Note, a random number between zero and the result of the population count minus one is not chosen because the first bit that is different between the parents is not a valid crossover point. That is, crossing the parents at the first non-matching bit would produce the same effect as swapping the two parents. However, at the second set point and beyond, the parents have at least one difference, the first set point. Therefore, in order to determine the set of unique crossover points, one must exclude the first point and only include those points that are different which are to the right of the first point that is different. The first such bit is the ninth bit in XOR 502. To obtain the bit position of the Nth set bit in XOR 502, a linear search of XOR 502 is preformed to find the Nth set bit, the index of which is the randomly chosen unique crossover point.

The algorithmic complexity of the extra processing required to find the unique crossover point is linear with respect to the length of the string. Crossover operations already have linear algorithmic complexity due to the need to copy bits from the parent strings to form the offspring string. Therefore, exemplary embodiments only increases the algorithmic complexity of performing a crossover operation by constant factors.

Exemplary embodiments can be extended to tree-based genetic programming tools. For tree-based genetic programming tools, a crossover operation involves selecting a crossover point in each parent. The same crossover point is not necessarily used for both parents. A random crossover point in the first parent is selected. The unique crossover points in the second parent are identified, given the sub-tree selected from the first parent. A unique crossover point in the second parent has a sub-tree that is different from that of the first parent; they may not be identical nor equivalent under rotation (by swapping operands to commutative operations). A unique crossover point in the second parent is randomly chosen.

According to another exemplary embodiment, alleles are weighted equally when selecting bits for crossover operations and mutation operations so as not to favor alleles that have more bits. Randomly choosing bits from the string as a whole tends to favor alleles in the string with the most bits. In practice, shorter alleles sometimes have more impact on the solution than larger ones.

According to the exemplary embodiment, before selecting a bit position for a crossover operation or mutation operation, an allele is randomly selected from a string, and then a bit within that allele is randomly selected. For example, in FIG. 5, every four bits, such as bits 1-4, 5-8, 9-12 and 13-16, of parent 0 402 comprises an allele. Therefore, one allele of the four alleles is randomly chosen, for example, the field comprising bits 5-8. One bit out of the bits comprising this field is then randomly selected, for example, bit 6, the second bit in the allele. If the crossover operation or mutation operation requires multiple bit positions, the process of selecting an allele and then a bit is repeated until the necessary number of unique bit positions has been selected. Doing so weights all alleles equally, regardless of how many bits they have. In an exemplary embodiment, an allele in a string may represent an array of smaller suballeles. In this case, according to another exemplary embodiment, the option exists to either treat the whole array as an allele, and weight the allele as a whole equally with the other alleles in the string, or to treat each element as an allele, and weight all elements of alleles and scalar alleles equally.

There are several ways to combine the first and second methods for crossover operations. In one exemplary embodiment, the logical-XOR of the two parent strings is taken to create a new string X. The string X identifies the bits that are different in the two parent strings. A linear search is performed for the first set bit in the new string X, and that bit is cleared. Now, X contains set bits for only the unique crossover points. Next, an allele is randomly selected, and then a unique crossover point is randomly selected from that allele (using X). If there is only one unique crossover point from a selected allele, that bit is selected. If there are no unique crossover points in that allele, according to an exemplary embodiment either (1) randomly choose another allele, or (2) for simplicity select a random bit position from this allele.

The first option may lead to several attempts to choose an allele with a unique crossover point in cases where parent strings are similar, whereas the second option will favor crossover points adjacent to alleles with values common in the two parent strings, although not as much as a conventional crossover.

A third, more complex option is to determine which alleles have unique crossover points and choose randomly between them. According to an exemplary embodiment, a string X of unique crossover points is computed as described above. Next, each allele in the string is sequenced through, creating an array A with an element for each allele in the string with unique crossover points, containing the bit index of that allele. Next, a number from 0 to the number of alleles with unique crossover points minus one (inclusive) is randomly chosen. Thus, the bit index of an allele with unique crossover points is obtained. However, a unique crossover point in that allele still needs to be selected. A population count on the portion of X corresponding to the selected allele is performed. Again, a random number between 0 and the number of unique crossover points in the allele (taken from A) is determined. A linear search within the allele in the string X is performed to find the bit position of the randomly chosen unique crossover point. This combined method is more complex than the others proposed above, but is fair and will obtain a unique crossover point without having to select random alleles multiple times in order to find one with unique crossover points.

The exemplary embodiment wherein alleles are weighted equally when selecting bits for crossover operations and mutation operations so as not to favor alleles that have more bits can be extended by allowing the user to dictate how alleles are weighted for selection for genetic operations. This can allow the user to specify a weighting of alleles that weights alleles considered more important more than others. This weighting is used when randomly choosing an allele for a genetic operation. However, it is not always easy to tell which alleles are more important and this can skew the results of the evolution.

Figure 6:
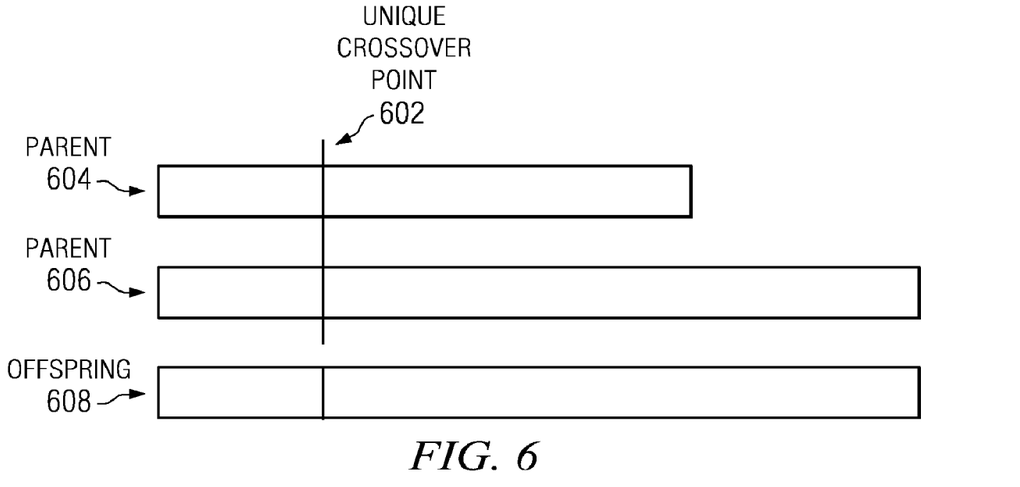
FIG. 6 illustrates selecting bits in a string-based genetic algorithm using variable length string in accordance with exemplary embodiment.

FIG. 6 illustrates selecting bits in a string-based genetic algorithm using variable length string in accordance with exemplary embodiment. FIG. 6 comprises three strings, parent 604, parent 606, and offspring 608. Offspring 608 is generated by crossing parent 604 and 606 at unique crossover point 602.

As can be seen, parent 604 and parent 606 are strings that have different lengths. For variable length strings, strings that have different lengths, the unique crossover point must be within the shorter of the two parent strings being crossed. Unique crossover point 602 is determined as described in FIG. 5. The offspring string, such as offspring 608, will be the length of one of the parents, depending upon which parent the right side of the offspring is chosen from. In offspring 608, the right side of offspring 608, the side to the right of unique crossover point 602, comes from parent 606. The left side of offspring 608 comes from parent 604.

Figure 7:
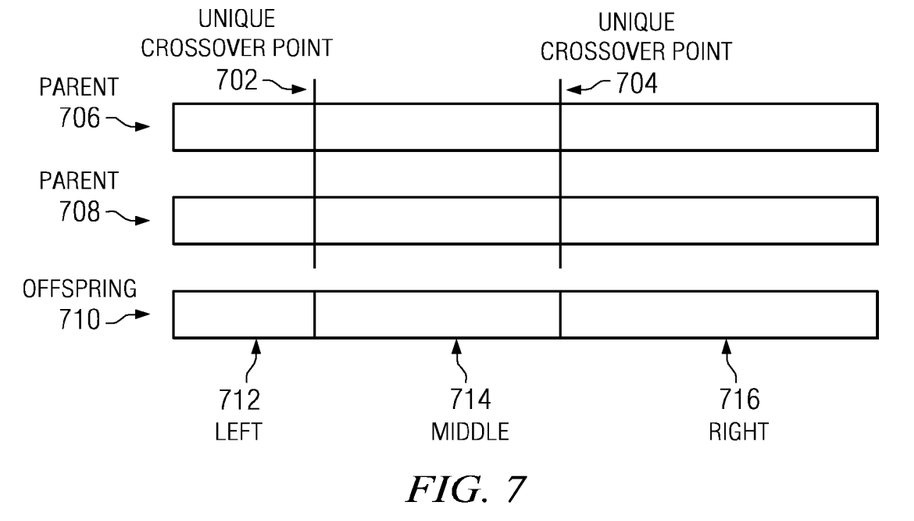
FIG. 7 illustrates selecting bits in a string-based genetic algorithm in accordance with another exemplary embodiment.

FIG. 7 illustrates selecting bits in a string-based genetic algorithm in accordance with another exemplary embodiment. FIG. 7 comprises three strings, parent 706, parent 708, and offspring 710. FIG. 7 illustrates the case where offspring 710 is generated from two parent strings, using multiple unique crossover points. In the present example, two unique crossover points, 702 and 704, are used to generate offspring 710. Unique crossover points 702 and 704 are determined as described in FIG. 5. As two unique crossover points are used, offspring 710 has three portions, left 712, middle 714, and right 716. In practical terms left 712 and right 716 must come from the same parent string. Otherwise, there would be no difference from using just one unique crossover point if either the left 712 or right 716 came from the same parent as the middle 714. It should be understood that as more than just two unique crossover points could be used to generate a new offspring string, many ways of selecting and combining various portions of the parent strings exist. The present example is in no way meant to limit the exemplary embodiments to the example shown.

Figure 8:
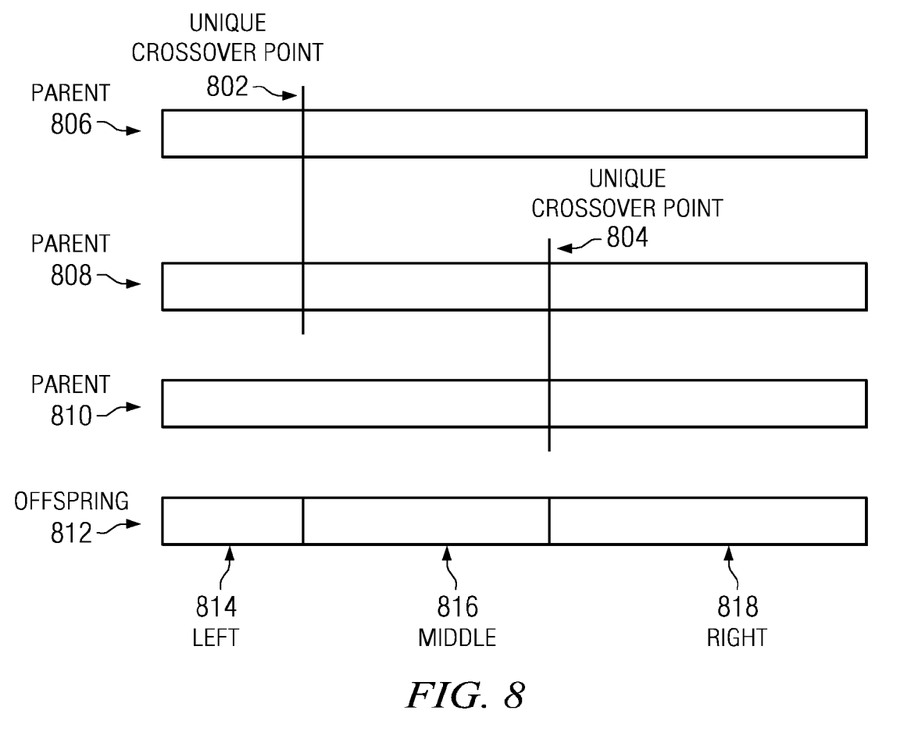
FIG. 8 illustrates selecting bits in a string-based genetic algorithm with multiple pairs of parent strings in accordance with another exemplary embodiment.

FIG. 8 illustrates selecting bits in a string-based genetic algorithm with multiple pairs of parent strings in accordance with another exemplary embodiment. FIG. 8 comprises four strings, parent 806, parent 808, parent 810, and offspring 812. FIG. 8 illustrates the case where offspring 812 is generated from a set of multiple unique pairs of parent strings, using crossover points that are unique to each pair of parent strings. A plurality of strings are received as input and n-1 unique pairs of parent strings are determined to form a set of unique pairs of strings. N is the number of strings in the plurality of strings. These parent strings are typically unique strings from the previous generation. Thus, in the present example, parent 806 and parent 808 form one unique pair of strings from the set of three input strings while parent 808 and parent 810 form a second unique pair of strings.

In the present example, as there are two unique pairs of strings, two unique crossover points, 802 and 804, are used to generate offspring 812. Unique crossover points 802 and 804 are determined as described in FIG. 5. In the case of multiple pairs of parent strings, when selecting a unique crossover point form the determined set of unique crossover points, an additional factor needs to be accounted for, the unique crossover point of the next pair of parents must be chosen from the remaining, right side, portion of the common parent from the two pairs of strings. For example, in the present example, parent 808 is common to both pairs of parent strings. Thus, when the unique crossover point is picked for the pair comprising parent 806 and 808, the left of parent 806 to the left of the crossover point is used and the portion of parent 808 to the right of the crossover point is used. Therefore, when picking a unique crossover point for the pair of parent strings, parent 808 and parent 810, the unique crossover point must occur within the remaining right side portion of parent 808. Unique crossover point 802 is a unique crossover point for the unique pair of parent 806 and 808. Unique crossover point 804 is a unique crossover point for the unique pair of parent 808 and 810. As two unique crossover points are used, offspring 812 has three portions, left 814, middle 816, and right 818. A user may decide which portion of offspring 812 come from which parent. In the present example, left 814 must come from either parent 806 or 808, right 818 must come from either parent 808 or 810 and middle 814 could come from any of the three parent. It should be understood that more than just three parent strings may be used to generate a new offspring. In the case where more than three strings are used to generate a new offspring, each unique pair of strings will be compared to identify all the unique crossover points for the pair and one point will be randomly selected from the set of unique crossover points for each unique pair. Thus, a set of unique crossover points will be identified. A new offspring will be generated based on the set of unique of crossover points, using the portions of the parent string determined by the user. The present example is in no way meant to limit the exemplary embodiments to the example shown.

Figure 9:
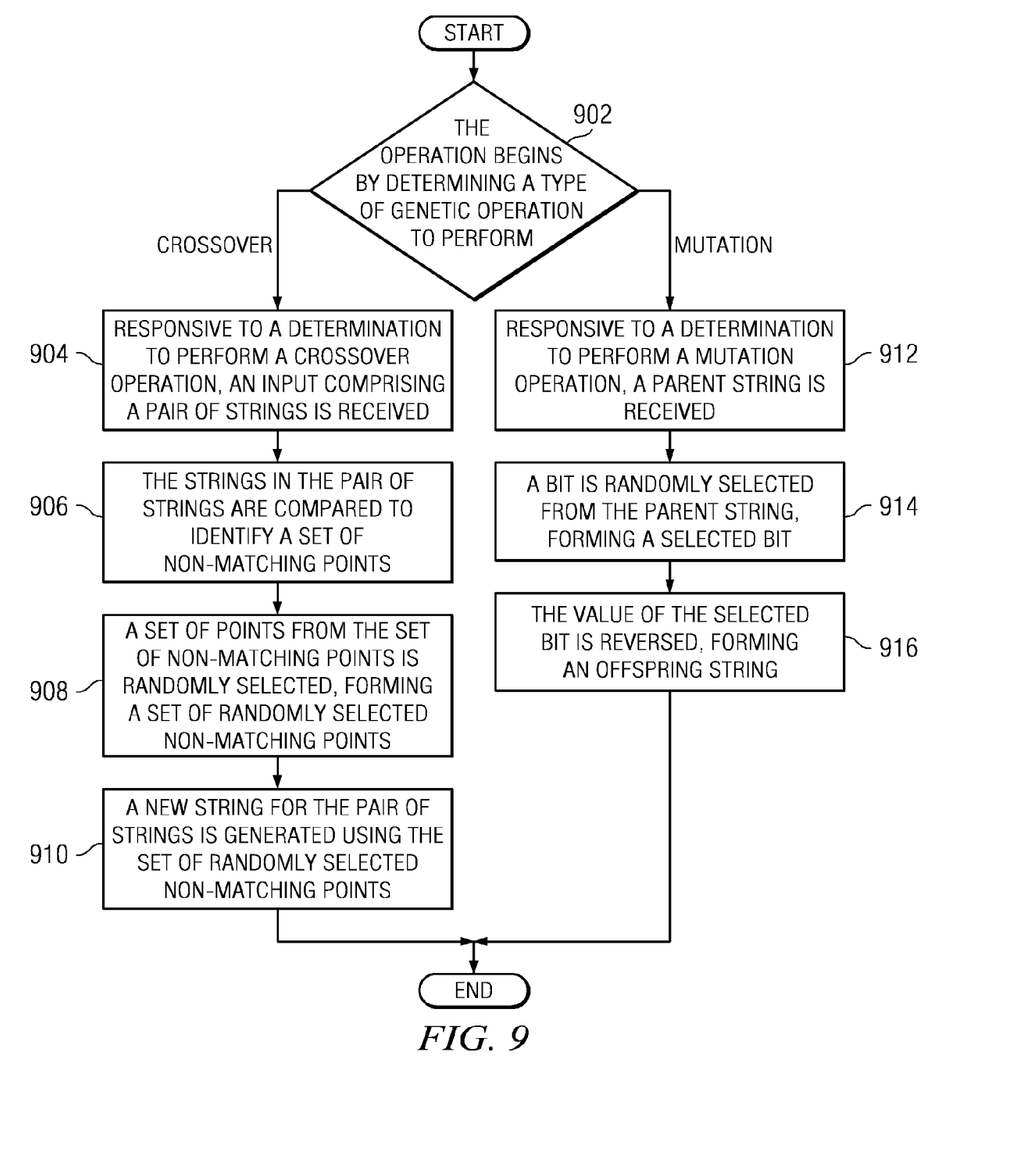
FIG. 9 is a flowchart illustrating the operation of selecting bits in a string-based genetic algorithm in accordance with an exemplary embodiment.

FIG. 9 is a flowchart illustrating the operation of selecting bits in a string-based genetic algorithm in accordance with an exemplary embodiment. The operation of FIG. 9 may be performed by software module 306 of FIG. 3 executing a on a data processing system such as data processing system 200 of FIG. 2. The operation begins by determining a type of genetic operation to perform (step 902). Responsive to a determination to perform a crossover operation, an input comprising a pair of strings is received (step 904). The strings in the pair of strings are compared to identify a set of non-matching points (step 906). A set of points from the set of non-matching points is randomly selected, forming a set of randomly selected non-matching points (step 908). A new string for the pair of strings is generated using the set of randomly selected non-matching points (step 910). The new string is presented to a user.

Responsive to a determination to perform a mutation operation, a parent string is received (step 912). A bit is randomly selected from the parent string, forming a selected bit (step 914). The value of the selected bit is reversed, forming an offspring string (step 916) and the operation ends.

Optionally, the new string is added to a new population being generated only if the new string is not already present in the new population. Further, the new string may also be checked against the population of the previous generation of strings to verify that the new string is also unique in comparison to the previous generation. If so, the new string is added to the population.

Further, when the set of randomly selected non-matching points comprises only one non-matching point, which is frequently the case, then optionally, a second new string for the pair of strings using may be generated. This second new string is different from the new string. Thus generating all the possible children of the two parents for the single point. If more than one point is used, then all the children could be generated or just one. Also, when the parent strings are of different lengths, the set of randomly selected non-matching points must all occur in the shorter of the two parent strings.

The exemplary embodiments illustrated in FIGS. 5-8 and described above provide specific examples of the step of comparing each unique pair of strings in the set of unique pairs of strings are compared to identify a set of unique points for each unique pair of strings.

Thus, exemplary embodiments provide improvements to string-based genetic algorithms that will give all possible offspring from a crossover an equal probability of being produced, and avoid favoring large alleles for crossovers and mutations. Exemplary embodiments make the genetic algorithm more robust, more resilient to local optima, and less sensitive to the order of alleles in the string. Exemplary embodiments make the genetic algorithm more efficient by reducing the number of generations and/or population size required to converge on a desirable result, thereby eliminating costly fitness evaluations.

Exemplary embodiments provide for various methods selecting bit positions for genetic operations in string-based genetic algorithms These new methods can be implemented individually or together as part of an improved string-based genetic algorithm toolset. A plurality of strings are received as input. The input plurality of strings defines a set of n-1 unique pairs of strings, wherein n is the number of strings in the plurality of strings. Each pair of unique strings in the set of n-1 unique pairs of strings are compared to identify one or more unique crossover points in the pair of strings. A child string is then generated.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer executed method for selecting bits in a string-based genetic algorithm, the computer executed method comprising:
    a type of genetic operation to execute;
    responsive to a determination that the type of genetic operation is a crossover operation that swaps bits between a pair of bit strings by swapping bits on the pair of strings on at least one side of a crossover point receiving an input comprising the pair of bit strings;
    comparing the pair of bit strings to identify a set of non-matching points, wherein the non-matching points are identical bit positions within the pair of bit strings having different bit values for each of the pair of bit strings, wherein comparing strings in the pair of strings to identify a set of non-matching points comprises performing a logical exclusive OR (XOR) operation on the pair of bit strings to obtain an intermediate bit string, wherein the intermediate bit string indicates bits that are different between each bit string of each unique pair of bit strings;
    randomly selecting a set of points from the set of non-matching points;
    generating a new bit string corresponding to the crossover operation of the pair of bit strings using the set of randomly selected non-matching points.

2. The computer implemented method of claim 1, wherein comparing strings in the pair of strings to identify a set of non-matching points further comprises:
    performing a population count on the intermediate bit string, wherein the population count is a number of non-matching bits in the unique pair of bit strings; and
    wherein the step of selecting, by computer execution, randomly, the set of points from the set of non-matching points, forming the set of randomly selected non-matching points comprises;
    randomly selecting for each point in the set of points, a number between one and the population count minus one, inclusive;
    searching the intermediate bit string for a set bit after the first set bit that corresponds to the randomly selected number; and selecting the set bit that corresponds to the randomly selected number, forming the randomly selected point.

3. The computer implemented method of claim 1, further comprising:

responsive to a determination that the new bit string is not present in a new population of bit strings, adding the new bit string to the new population.

4. The computer implemented method of claim 1, wherein the new bit string is unique in relation to a previous population of strings.

5. The computer implemented method of claim 1, further comprising:

generating a second new bit string for the pair of strings using the set of randomly selected non-matching points, wherein the second new bit string is different from the new bit string.

6. The computer implemented method of claim 1, wherein the set of randomly selected non-matching points comprises one randomly selected non-matching point.

7. The computer implemented method of claim 1, wherein each string of the pair of bit strings is a different length and wherein the set of randomly selected non-matching points are within a shorter bit string of the pair strings.

8. The computer implemented method of claim 1, wherein comparing-strings in the pair of bit strings to identify a set of non-matching points comprises:

selecting randomly, an allele from a set of alleles comprising each string, to form a selected allele, wherein each field in the set of fields are weighted equally; and comparing the selected allele in each string to identify the set of non-matching points.

9. A data processing system for selecting bits in a string-based genetic algorithm, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to determine a type of genetic operation to perform; in response to a determination that the type of genetic operation is a crossover operation that swaps bits between a pair of bit strings by swapping bits on the pair of bit strings on at least one side of a crossover point, receive an input comprising the pair of bit strings; compare the pair of strings to identify a set of non-matching points, wherein the non-matching points are bit positions within the pair of bit strings having different bit values for each of the pair of bit strings, wherein the computer usable code to compare bit strings in the pair of bit strings to identify a set of non-matching points comprises computer usable code to perform a logical exclusive OR (XOR) operation on the pair of bit strings to obtain an intermediate bit string, wherein the intermediate bit string indicates bits that are different between each bit string of each unique pair of bit strings; randomly select a set of points from the set of non-matching points; and generate a new bit string corresponding to the pair of strings using the set of randomly selected non-matching points.

10. The data processing system of claim 9, wherein the computer usable code to compare bit strings in the pair of bit strings to identify a set of non-matching points further comprises computer usable code to perform a population count on the intermediate bit string, wherein the population count is a number of non-matching bits in the unique pair of bit strings; and wherein the computer usable code to randomly select the set of points from the set of non-matching points comprises computer usable code to randomly select for each point in the set of points, a number between one and the population count minus one, inclusive, forming a randomly selected number; search the intermediate bit string for a set bit after the first set bit that corresponds to the randomly selected number; and select the set bit that corresponds to the randomly selected number, forming the randomly selected point.

11. The data processing system of claim 9, wherein the processing unit further executes the computer usable code to add, in response to a determination that the new bit string is not present in a new population of bit strings, the new bit string to the new population.

12. The data processing system of claim 9, wherein the new bit string is unique in relation to a previous population of bit strings.

13. The data processing system of claim 9, wherein the processing unit further executes the computer usable code to generate a second new bit string for the pair of bit strings using the set of randomly selected non-matching points, wherein the second new bit string is different from the new bit string.

14. The data processing system of claim 9, wherein the set of randomly selected non-matching points comprises one randomly selected non-matching point.

15. The data processing system of claim 9, wherein each bit string of the pair of bit strings is a different length and wherein the set of randomly selected non-matching points are within a shorter bit string of the pair bit strings.

16. The data processing system of claim 9, wherein the computer usable code to compare bit strings in the pair of bit strings to identify a set of non-matching points further comprises computer usable code to select, randomly, an allele from of a set alleles comprising each bit string, to form a selected allele, wherein each field in the set of fields are weighted equally, and compare the selected allele in each bit string to identify the set of non-matching points.

17. A computer program product for selecting bits in a string-based genetic algorithm, the computer program product comprising:

a computer usable medium having computer usable program code tangibly embodied thereon, the computer usable program code comprising:

computer usable program code for determining a type of genetic operation to perform;

computer usable program code for receiving, in response to a determination that the type of genetic operation is a crossover operation that swaps bits between a pair of bit strings by swapping bits on the pair of bit strings on at least one side of a crossover point, an input comprising the pair of bit strings;

computer usable program code for comparing the pair of bit strings to identify a set of non-matching points, wherein the non-matching points are bit positions within the pair of bit strings having different bit values for each of the pair of bit strings, wherein the computer usable program code for comparing bit strings in the pair of bit strings to identify a set of non-matching points comprises computer usable program code for performing a logical exclusive OR (XOR) operation on the pair of bit strings to obtain an intermediate bit string, wherein the intermediate bit string indicates bits that are different between each bit string of each unique pair of bit strings;

computer usable program code for randomly selecting a set of points from the set of non-matching points; and computer usable program code for generating a new bit string corresponding to the pair of bit strings using the set of randomly selected non-matching points.

18. The computer program product of claim 17, wherein the computer usable program code for comparing bit strings in the pair of bit strings to identify a set of non-matching points further comprises:

computer usable program code for performing a population count on the intermediate bit string, wherein the population count is a number of non-matching bits in the unique pair of bit strings; and wherein the computer usable program code for selecting, randomly, the set of points from the set of non-matching points, forming the set of randomly selected non-matching points further comprises;

computer usable program code for selecting, randomly, for each point in the set of points, a number between one and the population count minus one, inclusive, forming a randomly selected number;

computer usable program code for searching the intermediate bit string for a set bit after the first set bit that corresponds to the randomly selected number; and computer usable program code for selecting the set bit that corresponds to the randomly selected number, forming the randomly selected point.

19. The computer program product of claim 17, further comprising:

computer usable program code for adding, in response to a determination that the new bit string is not present in a new population of bit strings, adding the new bit string to the new population.

20. The computer implemented method of claim 17, wherein the new bit string is unique in relation to a previous population of bit strings.

* * * * *